(12) United States Patent
Wilkerson

(10) Patent No.: US 7,111,132 B2
(45) Date of Patent: Sep. 19, 2006

(54) PARALLEL PROCESSING APPARATUS, SYSTEM, AND METHOD UTILIZING CORRELATED DATA VALUE PAIRS

(75) Inventor: Christopher B. Wilkerson, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 232 days.

(21) Appl. No.: 10/231,696

(22) Filed: Aug. 30, 2002

(65) Prior Publication Data
US 2003/0009650 A1 Jan. 9, 2003

Related U.S. Application Data

(62) Division of application No. 09/195,012, filed on Nov. 18, 1998, now Pat. No. 6,463,580.

(51) Int. Cl.
  *G06F 12/00* (2006.01)
  *G06F 9/44* (2006.01)
  *G06F 9/46* (2006.01)
(52) U.S. Cl. ............... 711/154; 717/149; 717/160; 718/106; 712/203
(58) Field of Classification Search ............... 712/239; 711/221, 118, 213, 204, 137, 160; 717/160
See application file for complete search history.

(56) References Cited

U.S. PATENT DOCUMENTS 5,088,034 A * 2/1992 Ihara et al. ............... 717/160
5,652,858 A * 7/1997 Okada et al. ............... 711/137
5,781,752 A   7/1998 Moshovos et al. .......... 712/216
5,802,602 A   9/1998 Rahman et al. ............. 711/204
5,822,788 A * 10/1998 Kahn et al. ................. 711/213
6,247,107 B1 * 6/2001 Christie ...................... 711/216
6,317,810 B1 * 11/2001 Lopez-Aguado et al. ... 711/120
6,427,192 B1 * 7/2002 Roberts ...................... 711/133

OTHER PUBLICATIONS

"Microsoft Computer Dictionary Fifth Edition," Microsoft Press, 2002, pp. 304.*
Joseph, Doug.,et al. ,"Prefetching Using Markov Predictors", *Computer Architecture News*, 25 (2), (Jun. 1997),pp. 252-263.

* cited by examiner

*Primary Examiner*—Hong Kim
*Assistant Examiner*—Shane M. Thomas
(74) *Attorney, Agent, or Firm*—Schwegman, Lundberg, Woessner & Kluth, P.A.

(57) ABSTRACT

An apparatus may include a first storage location to store a key value of an activated correlated data values (CDV) pair and a second storage location to store a correlated value corresponding to the key value. An apparatus may also include a first storage location to store an instruction to activate a CDV pair and a second storage location to store an instruction to deactivate the CDV pair. A system may comprise a processor to fetch and execute a native instruction set including an instruction to activate a CDV pair and an instruction to deactivate the CDV pair, as well as a memory to store a table that includes the CDV pair. A machine-readable medium may include instructions causing a machine to perform a method comprising activating a CDV pair and performing a first task using the correlated value in parallel with a second task using the key value.

19 Claims, 3 Drawing Sheets

```
LOOP:
    IF(PTR==0)
    GOTO END_LOOP
    NUM=*(PTR)
    IF(NUM==NUMBER)
    GOTO END_LOOP
    PTR=*(PTR+4)
    IF(PTR==0)
    GOTO END_LOOP
    NUM=*(PTR)
    IF(NUM==NUMBER)
    GOTO END_LOOP
    PTR=*(PTR+4)
    BRA LOOP
```

| NODE 1,2 PROCESSED<br>LOOP:<br><br>   PRED_KEY SPTR, PTR<br>   IF(PTR==0)<br>   GOTO END_LOOP<br>   NUM=*(PTR)<br>   IF(NUM==NUMBER)<br>   GOTO END_LOOP<br>   PTR=*(PTR+4)<br><br>   IF(PTR==0)<br>   GOTO END_LOOP<br>   NUM=*(PTR)<br>   IF(NUM==NUMBER)<br>   GOTO END_LOOP<br>   PTR=*(PTR+4)<br>   PRED_VAL SPTR<br>   IF(SPTR!=PTR)<br>   GOTO LOOP | NODE 3,4 PROCESSED<br><br><br>IF(SPTR==0)<br>GOTO FIXUP1<br>SNUM=*(SPTR)<br>IF(SNUM==NUMBER)<br>GOTO FIXUP2<br>NSPTR=*(SPTR+4)<br><br>IF(NSPTR==0)<br>GOTO FIXUP3<br>SNUM=*(NSPTR)<br>IF(SNUM==NUMBER)<br>GOTO FIXUP4<br>NSPTR=*(NSPTR+4) |
|---|---|
| SYNCHRONIZE ||
| PTR=NSPTR ||
| GOTO LOOP ||

PARALLEL PROCESSING APPARATUS, SYSTEM, AND METHOD UTILIZING CORRELATED DATA VALUE PAIRS

RELATED APPLICATION

This application is a divisional of U.S. patent application Ser. No. 09/195,012 filed Nov. 18, 1998, now issued as U.S. Pat. No. 6,463,580.

FIELD

This invention relates generally to parallel processing, and more particularly to parallel processing utilizing correlated data values.

BACKGROUND

Generally, there has been a need for increasing the speed at which computer programs are executed. A computer typically has at least one processor running instructions that make up a computer program. In what is known as sequential or serial processing, the instructions that make up a computer program are executed one at a time by a processor of a computer. That is, a first instruction is executed, then a second instruction is executed, and so forth, until the program is finished. Therefore, in sequential or serial processing, the execution speed of programs can be increased by increasing the speed at which the processor of the computer executes instructions.

In another type of processing, known as parallel processing, increased program execution speed is achieved by executing program instructions in parallel with one another. Thus, for example, a first instruction may be executed by a first processor of the computer at the same time a second instruction is executed by a second processor (or, a different part of the first processor), then a third instruction may be executed by the first processor at the same time as a fourth instruction is executed by the second processor (or, the different part of the first processor), etc.

Parallel processing is not as commonly-used as sequential processing. Computer programmers, for example, are typically not as experienced in developing computer programs that take advantage of parallel processing as they are in writing programs that are to be processed sequentially. Thus, there has generally been more emphasis placed on increasing the speed of processors themselves to achieve increased execution speed of computer programs, rather than on utilizing parallel processing to achieve increased execution speed of computer programs.

BRIEF DESCRIPTION OF THE DRAWINGS

FIG. 3A is a prior art table of a linked list search;

FIG. 3B is a table of a linked list search according to an embodiment of the invention; and, FIG. 4 shows a diagram of a computer, in conjunction with which embodiments of the invention may be practiced.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Figure 1:
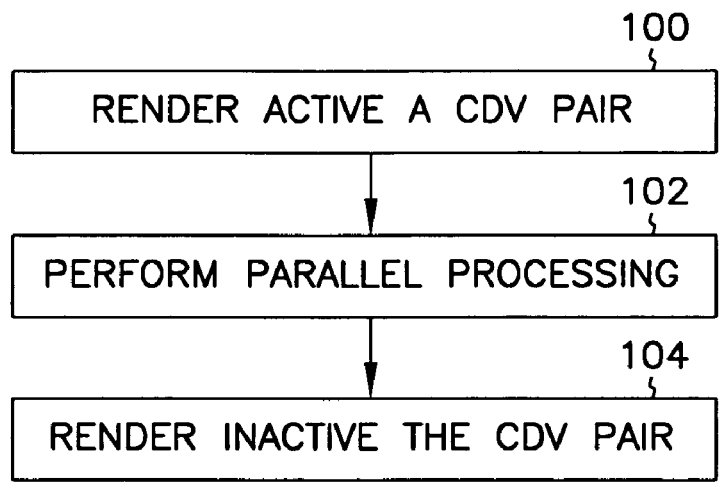
FIG. 1 is a flowchart of a method according to an embodiment of the invention.

Referring first to FIG. 1, a method according to an embodiment of the invention is shown. In block 100, a correlated data values (CDV) pair is rendered active so that parallel processing may be performed with respect to the correlated data values within the CDV pair.

The CDV pair includes a key value and a value correlated with the key value. Thus, a CDV pair is defined as including any data value and a correlated data value. The goal of the CDV pair is to improve performance. Correlated data values can occur in one situation when a sequence of instructions $f(X)$ has an input X that is correlated with an output Y. A CDV pair thus includes a single input and a single output, where the input is the key value, and the output is the value correlated with the key value. As an example for illustrative purposes only, and not meant to limit any embodiment of the invention, the input X and the output Y of a mathematical function $f(X)=Y$ are a CDV pair with a correlation of one. Embodiments of the invention also include correlated data values, such that the correlation may not be one. The definition of correlation may vary; in one embodiment, the correlation can be greater than 0.5, while in another embodiment, the correlation can be greater than 0.9.

For example, one situation where correlated data values occur is in a linked list. The first entry in a linked list may point to the second entry, based on some prior history, such that the second entry is correlated with the first entry (the first entry being the key value). Therefore, processing may be performed on the first and the second entries in parallel. However, the first entry may not always point to the second entry, such that processing of the second entry is said to be speculative. Processing of the second entry is not certain until it is known that in the current case the first entry does in fact point to the second entry. Note that this type of parallel processing is distinct from sequential processing, where processing of the second entry is not performed until after processing of the first entry has occurred.

In one embodiment, block 100 includes receiving the value correlated with the key value. Thus, an instruction may be executed having two arguments, where one argument includes the key value, and the other argument references an output register in which the value correlated with the key value is inserted. This can include looking up the key value in a table to obtain the value correlated with the key value. However, if a CDV pair corresponding to the key value does not already exist in the table, a storage location in the table can in one embodiment be allocated for the new CDV pair having the current key value.

In block 102, parallel processing is performed. That is, a task is performed in one iteration or thread utilizing the key value, and in another iteration or thread utilizing the value correlated with the key value. Thus, parallel processing is performed in block 102 by taking advantage of the correlation between the key value and the value correlated with the key value, as this pair was rendered active in block 100.

Finally, in block 104, the correlated data values pair is rendered inactive. Block 104 is thus complementary to block 100. In one embodiment, block 104 includes setting the value correlated with the key value. Thus, an instruction may be executed having one argument, where the argument is the value correlated with the key value previously passed as an argument when the pair was rendered active in block 100. This instruction in one embodiment can act to update a table in which CDV pairs are stored, such that the instruction passes the value correlated with and corresponding to the key value of the current, heretofore active CDV pair.

As described, a method according to one embodiment achieves parallel processing by rendering a correlated data values pair active, performing parallel processing instructions in relation to the two values of the CDV pair, and then rendering the pair inactive. Rendering the pair active in one particular embodiment obtains the correlated data value from a look up table corresponding to a given key value. Rendering the pair inactive in one particular embodiment stores the correlated data value corresponding to key value of the active pair.

Thus, by rendering the CDV pair inactive, in one particular embodiment, the CDV pairs stored in a table are continuously updated. In this manner, the correlation of the key values with their corresponding correlated data values can be maintained as close to one as possible, providing for more accurate parallel processing.

Figure 2:
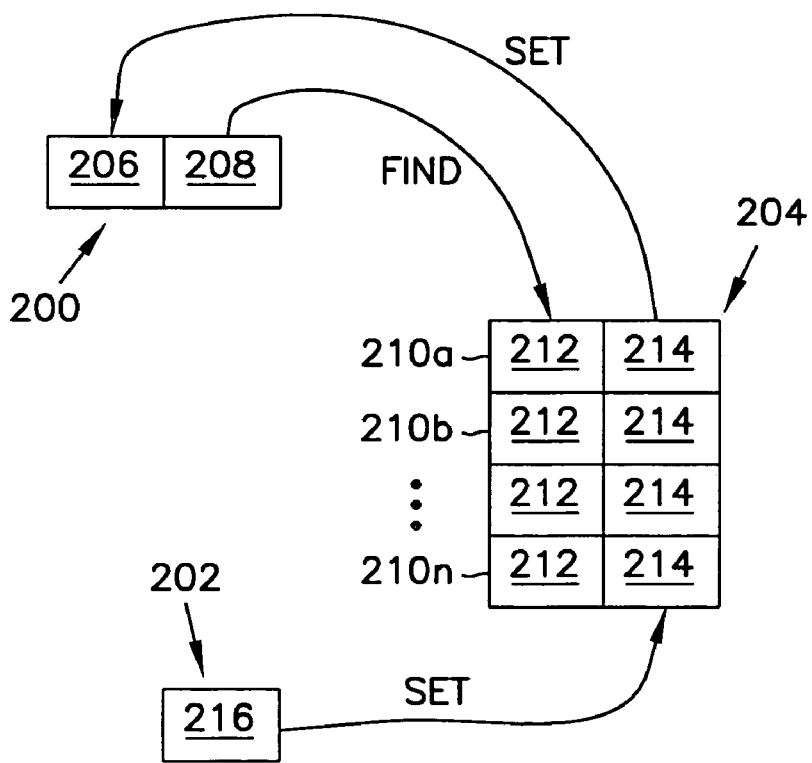
FIG. 2 is a diagram of a system according to an embodiment of the invention.

Referring next to FIG. 2, a diagram of a system according to an embodiment of the invention is shown. The system can in one embodiment be implemented as part of a processor of a computer, although embodiments of the invention are not so limited. That is, the instructions as described herein may be implemented as part of modules of a processor, etc., where the term module refers to any hardware aspect of the processor. Furthermore, the table as described herein may be implemented as stored in memory of the processor. Embodiments of the invention are not particularly limited. The system includes a first instruction 200, a second instruction 202, and a table 204. The instructions 200 and 202 are instructions native to the system (for example, a processor), such that computer programs may include these instructions as a part thereof.

The table 204 includes entries 210a, 210b, ..., 210n, where each entry includes a key value 212 and a value 214 correlated with the key value. New entries can be created in the table 204 for key values that are not already within an existing entry of table 204. Furthermore, the value 214 for an already existing entry within table 204 can also be changed. The value 214 for an existing entry within table 204 having a given key value 212 can also be looked up in the table 204.

Embodiments of the invention are not particularly limited to a given implementation of the table 204. In one embodiment, the table 204 is implemented as a direct mapped structure, as the structure is known in the art. In another embodiment, the table 204 is implemented as a two-way set associative structure, as the structure is also known within the art. The table 204 can also in another embodiment be stored within a cache that may already exist within the system (for example, where the system is a processor). In such an embodiment, the cache desirably should include an extra bit to differentiate between lines containing speculative data (that is, the CDV pairs), and lines containing normal addressable data.

The first instruction 200 is to receive a value correlated with a key value. The first instruction 200 includes a first argument 206 and a second argument 208. The first argument 206 is to hold the value correlated with the key value, and the second argument 208 is to hold the key value itself. Execution of the first instruction 200 renders the key value stored in the argument 208 and the value correlated with the key value stored in the argument 206 as a correlated data values (CDV) pair that is active.

Thus, execution of the first instruction 200 within a computer program operates as follows. The key value 212 of each entry 210a, 210b, ... 210n of the table 204 is examined to determine if there is a match with the parameter 208 of the first instruction 200. If there is a match, then the value 214 of this entry is returned in the parameter 206 (for example, inserting the correlated value 214 into a register referenced in the parameter 206). If there is not a match, then a new entry within the table 204 is created, having a key value 212 set to that of the key value within key value parameter 208 of the instruction 200.

The second instruction 202 is to set the value correlated with the key value. Because the second instruction 202 desirably should be executed after the first instruction 200 has already been executed, the value set by the second instruction 202 is the value correlated with the key value that was referenced in the parameter 208 of the instruction 200. The second instruction 202 includes an argument 216 to hold the value correlated with the key value. Execution of the second instruction 202 renders the CDV pair that had been previously made active by the first instruction 200 inactive.

Execution of the second instruction 202 works as follows. The value 214 of an entry within table 204 that was previously matched by execution of the first instruction 200 or created by execution of the first instruction 200 is set to the value of the argument 216 of the second instruction 202. In this manner, execution of the second instruction 202 updates the value 214 of the previously matched or created entry within table 204 that was correlated with the key value 212 of this entry. That is, the value of the argument 216 is the new value correlated with the key value of this entry.

It is noted that the instructions 200 and 202 work as a pair in one embodiment. That is, the instruction 200 activates a CDV pair, the pair being then deactivated with the instruction 202. Note that embodiments of the invention are not necessarily so limited. For example, in another embodiment of the invention, deactivation using an instruction such as instruction 202 may not be necessary following activation using an instruction such as the instruction 200.

An example of the use of one embodiment of the invention is shown by reference to FIG. 3A and FIG. 3B. The example is presented for illustrative purposes only, and is not meant to limit any embodiment of the invention. Referring first to FIG. 3A, a table is shown of a prior art linked list search, written in assembly without the use of CDV pairs. The critical path in the loop is determined by the instruction ptr=*(ptr+4) which de-references the next pointer and retrieves the address of the next element in a linked list. Since each node includes a pointer to the next node, the system (for example, a processor) is limited by the rate at which it can obtain pointers.

Referring next to FIG. 3B, a table is shown of a linked list search written in assembly utilizing CDV pairs, according to an embodiment of the invention. The table of FIG. 3B shows the loop in FIG. 3(a) reconfigured so as to be represented by two separate threads, identified by column 300 and column 302, utilizing an embodiment of the invention. The non-speculative thread is identified by column 300, and column 302 identifies the speculative thread. The pred_key instruction in column 300 corresponds to the first instruction of an embodiment of the invention as has been described (reference element 200 in FIG. 2). The pred_val instruction in column 300 corresponds to the second instruction of an embodiment of the invention as has been described (reference element 202 in FIG. 2). While the non-speculative code of column 300 processes nodes n, n+1 in the linked list, the speculative instructions in column 302 processes nodes n+2, n+3 using a speculative link. The synchronize instruction of FIG. 3B represents the execution point at which the two threads must synchronize.

It has been observed that speculative execution as shown in the example of FIG. 3B adds about 24% overhead to the non-speculative execution time of the loop; however, the throughput of the loop has doubled, resulting in a speed increase of about 50% on linked-list traversals with CDV history. As those of ordinary skill within the art may appreciate upon reading this disclosure, the first traversals of the list will be significantly slower due to the lack of CDV history. That is, traversals of the list are slower until a table of CDV pairs has been built up, such that values correlated with the key values have been set.

Figure 4:
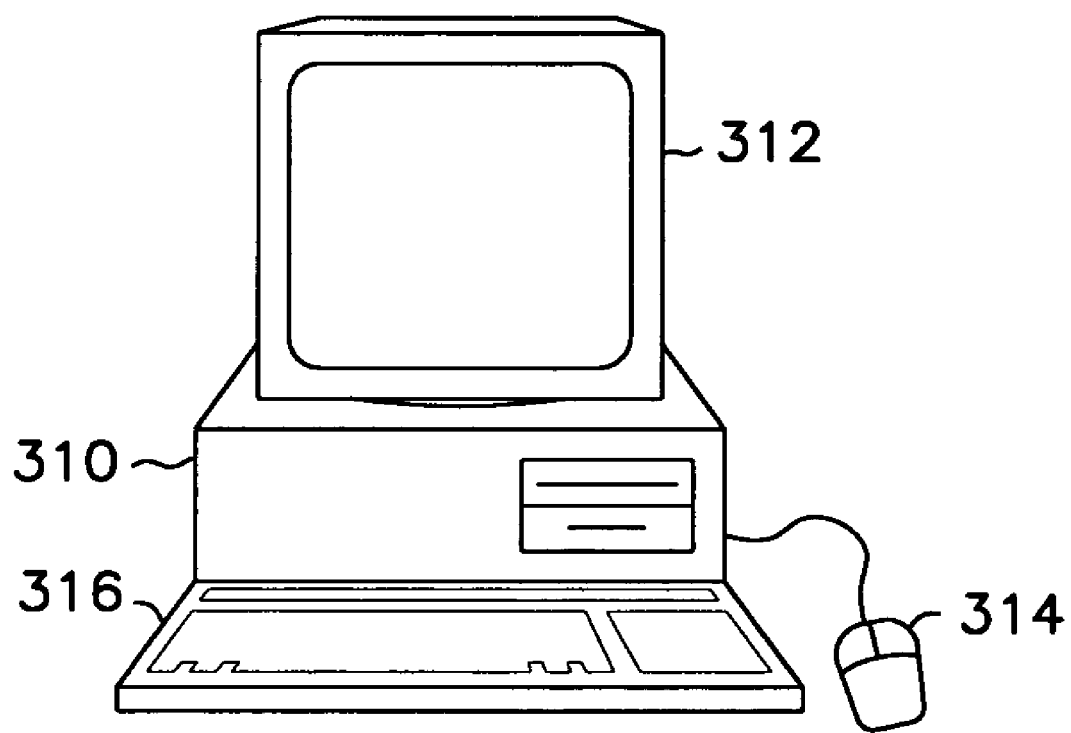

Referring to FIG. 4, a diagram of a computer in conjunction with which embodiments of the invention may be practiced is shown. Computer 310 is operatively coupled to monitor 312, a pointing device 314, and a keyboard 316. Computer 310 includes a processor that can be in accordance with various embodiments of the invention, random-access memory (RAM), read-only memory (ROM), and one or more storage devices, such as a hard disk drive, a floppy disk drive (into which a floppy disk can be inserted), an optical disk drive, and a tape cartridge drive. The memory, hard drives, floppy disks, etc., are types of computer-readable media. Embodiments of the invention are not particularly limited to any type of computer 310.

Monitor 312 permits the display of information within a viewing area, including computer, video and other information, for viewing by a user of the computer. Embodiments of the invention are not limited to any particular monitor 312, and monitor 312 is one type of display device that may be used by the invention. Such monitors include cathode ray tube (CRT) displays, as well as flat panel displays such as liquid crystal displays (LCD's). Pointing device 314 permits the control of the screen pointer provided by the graphical user interface of operating systems. Embodiments of the invention are not limited to any particular pointing device 314. Such pointing devices include mice, touch pads, trackballs, wheels, remote controls and point sticks. Finally, keyboard 316 permits entry of textual information into computer 310, as known within the art, and embodiments of the invention are not limited to any particular type of keyboard.

Parallel processing utilizing correlated data values has been described. Although specific embodiments have been illustrated and described herein, it will be appreciated by those of ordinary skill in the art that any arrangement calculated to achieve the same purpose may be substituted for the specific embodiments shown. This application is intended to cover any adaptations or variations of the present invention. Therefore, it is manifestly intended that this invention be limited only by the following claims and equivalents thereof.

It is emphasized that the Abstract is provided to comply with 37 C.F.R. §1.72(b) requiring an Abstract that will allow the reader to quickly ascertain the nature of the technical disclosure. It is submitted with the understanding that it will not be used to interpret or limit the scope or meaning of the claims.

In the foregoing Detailed Description, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment.

I claim:

1. An apparatus, comprising:
   a first storage location to store an instruction which, when executed, renders a key value stored as one argument of the instruction and a value correlated with the key value stored as another argument of the instruction as an active correlated data values (CDV) pair; and
   a second storage location to store an instruction to deactivate and update the active CDV pair, wherein activating the CDV pair enables performing a first task that uses the value correlated with the key value in parallel with a second task that uses the key value.

2. The apparatus of claim 1, wherein the first and the second storage locations are included in a processor.

3. The apparatus of claim 1, further comprising:
   a memory having a plurality of storage locations to store a plurality of CDV pairs including the CDV pair.

4. The apparatus of claim 1, further comprising:
   a third storage location to store the key value of the active CDV pair; and
   a fourth storage location to store the correlated value corresponding to the key value.

5. The apparatus of claim 4, wherein the third and fourth storage locations are included in a processor memory.

6. The apparatus of claim 1, further comprising:
   a register to be referenced by the another argument of the instruction to activate the CDV pair, wherein the instruction is a native instruction of a processor.

7. The apparatus of claim 1, further comprising:
   a memory to store a table of CDV pairs including the active CDV pair.

8. The apparatus of claim 1, wherein the instruction to activate the CDV pair is stored in a first module of a processor and the instruction to deactivate the CDV pair is stored in a second module of the processor.

9. A system, comprising:
   a processor to retrieve a native instruction set including an instruction to activate a correlated data values (CDV) pair and an instruction to deactivate and update an active CDV pair; and
   a memory to store the CDV pair, wherein executing the instruction to activate renders a key value stored as one argument of the instruction to activate and a value correlated with the key value stored as another argument of the instruction to activate as the active CDV pair, and wherein activating the CDV pair enables performing a first task that uses the value correlated with the key value in parallel with a second task that uses the key value.

10. The system of claim 9, wherein the instruction to activate is associated with the another argument to reference an output register to receive the value correlated with the key value.

11. The system of claim 10, wherein the instruction to deactivate is associated with an argument comprising the value correlated with the key value.

12. The system of claim 9, wherein the instruction to activate is retrieved from the memory.

13. The system of claim 9, wherein the instruction to deactivate is retrieved from the memory.

14. The system of claim 9, wherein the CDV pair is stored in a table included in the memory.

15. A computer-readable medium having stored thereon a set of instructions which when executed by a machine cause the machine to perform a method comprising:
    activating a correlated data values (CDV) pair comprising a key value and a correlated value corresponding to the key value by executing an instruction that renders the key value stored as one argument of the instruction and the correlated value corresponding to the key value stored as another argument of the instruction as an active CDV pair; and
    performing a first task that uses the correlated value corresponding to the key value in parallel with a second task that uses the key and
    deactivating and updating the active CDV pair.

16. The computer-readable medium of claim 15, wherein activating the CDV pair comprises receiving the correlated value corresponding to the key value.

17. The computer-readable medium of claim 15, wherein activating the CDV pair comprises looking up the key value in a table to obtain the correlated value corresponding to the key value.

18. The computer-readable medium of claim 15, wherein deactivating the active CDV pair comprises setting the correlated value corresponding to the key value.

19. The computer-readable medium of claim 15, wherein deactivating the active CDV pair comprises storing in a table the correlated value corresponding to the key value.

* * * * *

UNITED STATES PATENT AND TRADEMARK OFFICE
CERTIFICATE OF CORRECTION

PATENT NO.          : 7,111,132 B2
APPLICATION NO.  : 10/231696
DATED                  : September 19, 2006
INVENTOR(S)         : Wilkerson It is certified that error appears in the above-identified patent and that said Letters Patent is hereby corrected as shown below:

On the Title page, in field (56), under "Other Publications", in column 2, line 3, delete "Doug.,et al.," and insert -- Doug., et al., --, therefor.

In column 7, line 19, in Claim 15, delete "pair; and" and insert -- pair; -- therefor.

In column 8, line 3, in Claim 15, after "key" insert -- value; --.

Signed and Sealed this

Twenty-sixth Day of February, 2008

JON W. DUDAS
*Director of the United States Patent and Trademark Office*